3,362,959
PRODUCTION OF (−)-2-DEHYDROEMETINE AND
INTERMEDIATES EMPLOYED THEREIN
John Derek Cocker, Chalfont St. Peter, Keith Desmond
Eric Whiting, Brookman's Park, and Godfrey Basil
Webb, Greenford, England, assignors to Glaxo Laboratories Limited, Middlesex, England, a British company
No Drawing. Filed July 8, 1965, Ser. No. 470,600
Claims priority, application Great Britain, July 14, 1964,
28,984/64
15 Claims. (Cl. 260—286)

This invention relates to novel derivatives of racemic and optically active 2-dehydroemetine and processes for their production, as well as to a method for the resolution of racemic 2-dehydroemetine into its optically active isomers.

The compound (−)-2-dehydroemetine is a powerful amoebicide which possesses useful advantages over the natural drug (−)-emetine in that it possesses less tendency to induce unwanted side effects such as nausea, vomiting, hypotension and cardiac irregularity. As with emetine, the (+)-isomer is virtually inactive. Synthetic processes for the preparation of 2-dehydroemetine give the racemic compound unless optically active starting materials or intermediates are used, and in practice it has been difficult to find an economical process using optically active intermediates which are not racemized by the reaction conditions of the process. In order to obtain the desired (−)-isomer from the racemic mixture which is normally obtained it is necessary to find an effective method of resolution.

Attempts to resolve racemic 2-dehydroemetine in the form of addition salts with optically active acids have proved only partially successful and it is an object of the present invention to provide derivatives of 2-dehydroemetine which are more readily capable of resolution than the acid addition salts used previously.

We have found that amides of (±)-2-dehydroemetine formed with optically active carboxylic acids are more readily resolved than its acid addition salts with optically active acids and that such amides are in general more stable during conventional separation procedures such as crystallization, chromatography, etc.

According to the present invention, therefore, we provide as intermediates useful in the production of (−)-2-dehydroemetine, amides formed between optically active carboxylic acids and (a) (±)-2-dehydroemetine and (b) (−)-2-dehydroemetine.

The amides according to the invention can form acid addition salts at the benzoquinolizine nitrogen atom and such salts constitute a further feature of the invention. The acid addition salts include, for example, hydrochlorides, hydrobromides, sulphates, phosphates and other inorganic acid addition salts as well as salts with organic acids, including the various optically active acids referred to herein.

The optically active carboxylic acids forming the amides of the invention advantageously possess asymmetric centers in the α-position relative to the carboxyl group and also preferably carry one or more further polar groups such as hydroxyl groups, as in mandelic acid, or amino groups as in amino acids such as tyrosine, phenylalanine, etc. Optically active acids containing 2 or more carboxyl groups are particularly advantageous, especially tartaric acid and its O-substituted derivatives such as its mono- and di-acyl esters. Particularly preferred acids are optically active di-aroyl or di-lower alkanoyl tartaric acids such as dibenzoyl (+)-tartaric acid and diacetyl (+)-tartaric acid, especially the former. In the case of the monocarboxylic acids it is preferred that the asymmetric carbon atom should carry substituents of widely different bulk as in the amino and hydroxy acids referred to above which carry, at the asymmetric carbon atom, one phenyl or benzyl group and one small group namely a hydroxy or amino group. Bulky groups include aryl substituents such as phenyl, etc., or aralkyl groups such as benzyl, etc. The amino or hydroxy substituents may advantageously carry readily removed groups (protecting groups) such as acyl or arylmethyl groups as is described in detail below. Such protecting groups may be removed prior to the separation stage or subsequently.

The optically active acid from which the amide is derived may be either the laevo or dextro form and that isomer is generally preferred which gives the more insoluble amide with (−)-2-dehydroemetine. It is sometimes the case, however, that the most commonly available form of a particular acid is not the most favorable from the point of view of crystallization but is nevertheless commercially more attractive. Thus, for example, dibenzoyl-(−)-tartaric acid gives a more insoluble amide with (−)-2-dehydroemetine than with (+)-2-dehydroemetine while the reverse is true for dibenzoyl-(+)-tartaric acid. Nevertheless, (+)-tartaric acid is the naturally occurring isomer and its dibenzoyl ester is a preferred acid.

Other optically active acids convenient for use in forming the desired amides include α-chloro-acetic acids which are further α-substituted such as α-chloro-phenyl-acetic acid and even such complex acids as benzylpenicillin.

According to a further feature of the invention we provide a process for the production of an amide of (−)-2-dehydroemetine and an optically active carboxylic acid or an acid addition salt of said amide wherein an amide of (±)-2-dehydroemetine and an optically active carboxylic acid or an acid addition salt of said amide is subjected to fractionation to separate the amides of (+) and (−)-2-dehydroemetine or their acid addition salts.

The optically active diastereoisomeric amides according to the invention may be fractionated by, for example, such conventional methods as fractional crystallization, column chromatography, thin layer chromatography or even mechanical separation of the separate crystal forms, the most suitable method for any given diastereoisomers being found by preliminary experiments.

Fractional crystallization is the preferred method and the optimal solvent system should be chosen for each pair of diastereoisomeric amides. The nature of these solvents depends on the type of amide and by way of illustration the following table sets out a number of useful solvents for the fractional crystallization of amides from several different acids. The degree of separation can be followed by measurement of rotation or by thin layer chromatography.

TABLE

| Acids | Solvents |
| --- | --- |
| (+)-α-Chlorophenylacetic acid. | Acetonitrile, benzene/isopropylether, benzene/cyclohexane, nitromethane, 1,2-dimethoxyethane. |
| Diacetyl-(+)-tartaric acid | Acetonitrile, benzene, dioxan, tetrahydrofuran. |
| Dibenzoyl-(+)-tartaric acid. | Acetonitrile, benzene, dioxan, tetrahydrofuran, nitromethane, dimethylsulphoxide, dimethylformamide, dimethylacetamide, chloroform. |
| Mandelic acid (−) | Chloroform/ether, ethyl acetate, saturated with water, ethanol, methanol/water, isopropyl alcohol, toluene, acetone, nitromethane. |

The separated diastereoisomeric amides may be converted into the optically active isomers of 2-dehydroemetine, for example by methods conventional for converting amides into the parent amines. In general, the amide can be hydrolysed with alkali; the optically active isomers of 2-dehydroemetine will withstand vigorous conditions of hydrolysis without undue racemization or decomposition. The resolving agent is often racemized, however, or even decomposed by vigorous alkaline hydrolysis. The alkaline hydrolysis may, for example, be effected by heating the amide with aqueous or alcoholic alkali, for example sodium or potassium hydroxide, alkoxide, etc. The reaction temperature is preferably elevated and high temperatures can be achieved using high boiling alcohols as solvent, e.g., 2-methoxy-ethanol (B.P. 125° C.). In general, we have found that the diacyltartaric acid amides are hydrolysed at only moderately elevated temperatures, e.g., below 100° C., for example using alkali metal hydroxide in boiling ethanol.

The amides according to the invention may be prepared for example, by methods conventional for the preparation of amides. A number of suitable methods are given in the review by H. N. Rydon (Lecture Series, 1962, No. 5; Royal Inst. Chem.). These include reaction of the amine with various activated derivatives of the acids, for example the acid halides, e.g., the chloride, the acid azides, the anhydrides, and activated esters such as the phenylthiol ester, p-nitrophenylthiolester, p-nitrophenyl ester or N-hydroxyphthalimide "ester." The acid itself may be reacted with the (±)-2-dehydroemetine in the presence of dehydrating agents of the carbodiimide type.

In the case of optically active acids containin ggroups which would react with the carboxyl group or activated derivative thereof under the conditions of the condensation to form dimers or polymers, these should be protected before amide formation. The resulting amides may themselves be used in the resolution stage or they may be treated first to remove the protecting group.

In the case of the hydroxy acids, suitable protecting groups include acyl groups such as acetyl, propionyl or benzoyl, etc., which are readily removed by hydrolysis, e.g., with mild alkali, or arylmethyl ethers such as benzyl groups which may be removed by hydrogenation. α-hydroxycarboxylic acids such as mandelic acid may be converted into carboxy anhydrides by reaction with phosgene and in this case, the subsequent reaction with (±)-2-dehydroemetine gives the free α-hydroxy carboxylic acid amide.

Free amino groups may, for example, be protected by the formation of amide groups or N-arylmethyl or N-trityl derivatives. A number of useful protecting groups are described in the publication of Rydon mentioned above. Especially suitable protecting groups include the aralkoxy carbonyl groups such as the benzyloxycarbonyl, p-nitrobenzyloxycarbonyl, p-phenylazobenzyloxycarbonyl, p-(4-methoxyphenyl)azobenzyloxy-carbonyl and p-methoxybenzyloxycarbonyl groups, which can readily be removed by catalytic hydrogenation, alkoxycarbonyl groups such as t-butoxycarbonyl groups which can be removed by mild acid hydrolysis, triarylmethyl groups such as "trityl" groups which can be removed by mild acid hydrolysis or catalytic hydrogenation, trifluoroacetyl groups which can be removed by mild alkaline hydrolysis and phthaloyl groups which may be removed by reaction with hydrazine or substituted hydrazines.

The invention is now described in greater detail with reference to a number of particular optically active acids.

(1) (−)-Mandelic acid (a) (−)-Mandelic acid may first be protected by acetylation, for example, with acetyl chloride at 40° C., and then converted into an acid halide, e.g., the chloride, for example by reaction with a halogenating agent such as $SOCl_2$. The acetyl mandeloyl halide may then be reacted with the racemic 2-dehydroemetine, preferably in the presence of an acid binding agent, e.g., an inorganic base such as an alkali metal hydroxide or carbonate or, advantageously, an organic base such as a tertiary amine, for example, triethylamine, trimethylamine, etc. On treatment with mild alkali, e.g., 2 N aqueous alkali metal carbonate, a mixture is obtained of the 2'-(−)-mandeloyl derivatives of racemic 2-dehydroemetine.

(b) (−)-Mandelic acid may be reacted with a carbonyldihalide such as phosgene to produce the O-carboxyanhydride which is then reacted with the racemic 2-dehydroemetine in solution in a polar solvent such as acetonitrile to form directly the 2'-(−)-mandeloyl derivative.

The mixed isomers prepared in (a) and (b) above may then be separated, for example, by fractional crystallization from chloroform/ether according to the following methods:

(i) On crystallization from chloroform-ether, the amide of (+)-2-dehydroemetine separates as compact crystals that adhere to the walls of the flask, while the (−)-2-dehydroemetine derivative forms small needles that remain suspended in the solvent and can be separated by decantation, followed by filtration. In this way both diastereoisomers are obtained >90% pure and simple crystallization serves to complete the purification.

(ii) The mixture is crystallized from chloroform-ether in the presence of seeds of the (−)-2-dehydroemetine amide, and the crystallization is allowed to proceed for a limited time. The (−)-derivative that separates is almost free of the (+)-derivative. After removal of this material by filtration, the mother-liquors deposit a mixture of both forms, with the (+)-form predominating. Separation of the crystals as in (i) and crystallization of the appropriate fraction from ethanol then gives the pure (+)-amide. This has given nearly 25% of each diastereoisomer (i.e., nearly 50% of the theoretical).

Other separation methods include column chromatography or thin layer chromatography on silica.

The separated diastereoisomers may then be treated to recover the separate optical isomers of 2-dehydroemetine. Two useful methods are as follows:

(i) Hydrolysis with potassium hydroxide in aqueous 2-methoxyethanol at ca. 125° for about 3 days. In spite of the vigorous conditions the reaction is smooth and the yield of (+) or (−) dehydroemetine is very high; there is no racemization. However, the mandelic acid moiety is racemized in the process and so cannot be re-used.

(ii) Treatment with thionyl chloride to give the corresponding α-chloro-amide, which can be cleaved by relatively mild treatment with thiourea.

(2) (+)-α-Chlorophenylacetic acid

This acid may be converted to its acid chloride by reaction with $SOCl_2$, e.g., in dimethylformamide and the acid chloride, on reaction with racemic 2-dehydroemetine, e.g., in benzene/methylene chloride, gives the desired mixture of amides.

The mixed amides separate in distinct crystalline forms which can be separated by hand and/or they can be recrystallized from ethanol or acetonitrile with seeding.

For reconversion to the separate isomers of 2-dehydroemetine, two useful methods are as follows:

(i) Treatment with alkali as described above for the mandelic acid derivative; probably the first step is, in fact, replacement of the chlorine by hydroxyl with formation of the mandeloyl amide.

(ii) Treatment with thiourea in presence of sodium acetate in boiling ethanol or n-butanol; this method is specific for α-halogeno-amides.

(3) L-phenylalanine

L-phenylalanine may, for example, be reacted in the form of its N-carbobenzoxy p-nitrophenyl ester with racemic 2-dehydroemetine in a polar solvent such as acetonitrile. The carbobenzoxy group may then be removed, e.g., by catalytic hydrogenation, for example using palladium or charcoal.

The mixed amides may be separated, for example, by chromatography, e.g., by thin layer or column chromatography on silica.

The separate isomers of 2-dehydroemetine can then be regenerated by removal of the L-phenylalanyl group, for example by alkaline hydrolysis.

(4) *L-tyrosine*

L-Tyrosine in the form of its N-carbobenzoxy or N,O-dicarbobenzoxy derivative may be reacted with racemic 2-dehydroemetine in the presence of a carbodiimide reagent such as dicyclohexylcarbodiimide in an inert solvent such as tetrahydrofuran.

After amide formation the carbobenzoxy group or groups can, if desired, be removed, e.g., by catalytic hydrogenation or with HBr in glacial acetic acid.

The mixed amides can be separated, for example by chromatography, e.g., column or thin layer chromatography on silica.

The separated amides may finally be converted into the separate isomers of 2-dehydroemetine by, for example, alkaline hydrolysis, e.g., using an alkali metal alkoxide in alcohol, such as potassium butoxide in butanol, or by oxidation as described for example by Schmit et al. JACS, 81, 2228 (1952).

(5) *Dibenzoyl-(+)-tartaric acid and diacetyl-(+)-tartaric acid.*

These acids may, for example, be reacted with racemic 2-dehydroemetine in the form of their anhydrides. The reaction is preferably effected in a polar solvent for the reactants, e.g., acetonitrile. Alternatively this reaction may be effected in a two phase system of organic solvent and aqueous alkali, e.g., a mixture of benzene, dimethylformamide and aqueous potassium carbonate; in this way undesired side reactions are reduced.

The two diastereoisomeric forms of the amide which is formed differ considerably in their solubility in various solvents such as acetonitrile and benzene and can readily be separated by crystallization. The amide from (+)-dehydroemetine separates out leaving the amide of the (−)-form in the mother liquor.

The separate isomers of 2-dehydroemetine can be recovered from the separated amides by alkaline hydrolysis, generally under less vigorous conditions than are required to hydrolyze, for example, the mandeloyl derivative. Thus, for example, boiling with ethanolic sodium hydroxide for 24 hours furnishes the separated isomer in each case in good yield.

In general the dibenzoyl-(+)-tartaric acid amide is the preferred derivative in that it gives a greater difference of solubility between the (−) and the (+)-2-dehydroemetine derivatives than any of the amides previously tried.

(6) *Penicillin*

Benzyl penicillin may be reacted with dicyclohexylcarbodiimide to form benzyl penicillin anhydride which may then be reacted with mixed optical isomers of Formula I to give the mixed amides. The mixed amides may be separated by chromatography, e.g., thin layer chromatography on silica or column chromatography on silica or alumina. The separated amides may then be converted into the isomers of 2-hehydroemetine, by alkaline hydrolysis to remove the penicillin moiety.

In order that the invention may be well understood we give the following examples by way of illustration only, all temperatures are in ° C.

EXAMPLE 1

(a) *Conversion of (±)-2-dehydroemetine into its 2'-(−)-mandeloyl derivatives*

(i) 2-dehydroemetine dihydrochloride (196 g.) in hot water (2.4 l.) was basified with 4 N potassium carbonate and the liberated base was isolated with benzene (2 l.).

The benzene extract was concentrated to 1 l. and methylene chloride (400 ml.) and triethylamine (47 ml.) added. The solution was cooled in ice and treated over a period of 45 min. with a solution of (−)-acetylmandeloyl chloride (76 g.) in benzene (400 ml.). After stirring for a further 15 min. the organic phase was washed with a solution of sodium bicarbonate (800 ml.) followed by pH 4 buffer (3×300 ml.). The organic phase, after being dried over sodium sulphate, was evaporated to give the mixed 2'-acetyl-(−)-mandeloyl derivatives of (+) and (−)-2-dehydroemetine as a froth; $[\alpha]_D^{28}$ −49.6° (c. 1.1 in CHCl$_3$).

This material was dissolved in methanol (2.9 l.) and water (1.25 l.) and treated with 2 N-sodium carbonate solution (420 ml.). After being kept for 24 hrs. at room temperature, the mixture was treated with water (1 l.) and the precipitated mixture of 2'-(−)-mandeloyl derivatives of (+) and (−)-2-dehydroemetine was filtered off and dried; (161.7 g.), $[\alpha]_D^{26}$ −21.5° (c. 1.0 in CHCl$_3$). R$_f$ 0.34 and 0.48 (Kieselgel G/ethyl acetate: chloroform:methanol 5:5:1).

(ii) 2-dehydroemetine (0.478 g.) was dissolved in acetonitrile (5 ml.) and treated with the O-carboxyanhydride of (−)-mandelic acid (0.4 g.). After being kept for 2 hrs. at room temperature the reaction mixture was partitioned between benzene and sodium bicarbonate solution. Removal of the benzene gave a solid which was chromatographically identical with the product of (i) above.

(b) *Separation of 2'-(−)-mandeloyl derivatives of (+)- and (−)-2-dehydroemetine.*

The mixture prepared as in Example (a)i, (11 g.) was dissolved in chloroform (25 ml.) and ether (300 ml.) was added. After removal of a trace of flocculent material by filtration, the filtrate was kept for 3 hrs. at room temperature, giving needles (2.67 g.), $[\alpha]_D^{26}$ −234° (c. 0.97 in CHCl$_3$). Further crystallization of this solid from ethanol gave 2'-(−)-mandeloyl-(−)-2-dehydroemetine as needles, $[\alpha]_D^{26}$ −244.5° (c. 1.0 in chloroform), R$_f$ 0.34, M.P. 138–144° (decomp.);

$$\lambda_{max.}^{EtOH}\ 281\text{--}285\ m\mu\ (\epsilon\ 7980)$$

(Found: C, 72.8; H, 7.4; N, 4.8. C$_{37}$H$_{44}$N$_2$O$_6$ requires C, 72.5; H, 7.2; N, 4.6%.)

The ether-chloroform filtrate was kept a further 24 hrs. at room temperature and the mixed crystals were filtered off and dried (5.56 g.). On shaking with ether the fine needles could be removed by decantation leaving compacted roundels (3.5 g.), $[\alpha]_D$ +150.5° (c., 1.2 in chloroform). Crystallization of this latter material from ethanol gave 2'-(−)-mandeloyl-(+)-2-dehydroemetine, $[\alpha]_D^{25}$ +202.6° (c. 1.2 in chloroform) R$_f$ 0.48, M.P. 173.5–177° (decomp.).

$$\lambda_{max.}^{EtOH}\ 282\text{--}285\ m\mu\ (\epsilon\ 8150)$$

(Found: C, 72.3; H, 6.9; N, 4.8. C$_{37}$H$_{44}$N$_2$O$_6$ requires C, 72.5; H, 7.2; N, 4.6%.)

(c) *(+)-2-dehydroemetine*

2'-(−)-mandeloyl-(+)-2-dehydroemetine (3.62 g.) was treated with a solution of potassium hydroxide (5.9 g.) in a mixture of water (16 ml.) and methoxyethanol (80 ml.) and heated under reflux for 68 hrs. The solvents were removed in vacuo and the residue partitioned between benzene and sodium carbonate solution. The benzene phase was extracted with pH 4 buffer (2×100 ml.). The extract was basified with 2 N sodium carbonate and the precipitated base isolated with benzene. After drying over sodium sulphate, removal of the benzene gave a froth (2.85 g.). Crystallization from isopropyl ether/ether gave (+)-2-dehydroemetine (2.33 g.), $[\alpha]_D$ +188.7° (c., 1.3 in methanol), M.P. 93–99°, $$\lambda_{max.}^{EtOH}\ 282\text{--}285\ m\mu\ (\epsilon\ 7550)$$

(Found: C, 72.5; H, 8.1; N, 5.9. $C_{29}H_{38}N_2O_4$ requires C, 72.8; H, 8.0; N, 5.9%.)

(d) *(−)-2-dehydroemetine*

2′-(−)-mandeloyl-(−)-2-dehydroemetine (1.5 g.) was treated with a solution of potassium hydroxide (2.24 g.) in a mixture of water (6 ml.) and methoxyethanol (30 ml.) and heated under reflux for 68 hr.

The reaction was worked-up as in (c) to give a froth (1.16 g.). Crystallization from isopropyl ether/diethyl ether gave (−)-2-dehydroemetine (0.99 g.), M.P. 93–99° $[\alpha]_D^{25}$ −188° (c., 1.0 in methanol). The Nuclear Magnetic Resonance (NMR) spectrum ($CDCl_3$), infrared spectrum ($CHBr_3$ and $R_f$ value in three solvent systems were identical with those of (+) and (±)-2-dehydroemetine. (Found: C, 72.8; H, 7.9; N, 6.1. $C_{29}H_{38}N_2O_4$ requires C, 72.8; H, 8.0; N, 5.9%.)

EXAMPLE 2

(a) *Conversion of (±)-2-dehydroemetine into its 2′-(+)-α-chlorophenyl-acetyl derivatives*

(+)-α-Chlorophenylacetic acid (5.9 g.), redistilled thionyl chloride (14.7 ml.), and N,N-dimethylformamide (0.25 ml.) were maintained at 55° in presence of a small porous chip until gas evolution ceased (45 mins.). The excess reagent was removed in vacuo, leaving crude (+)-α-chlorophenylacetyl chloride as an oil, $[\alpha]_D$ +230° (c., 1 in benzene). This was dissolved in benzene (25 ml.) and added dropwise to a stirred solution of (±)-2-dehydroemetine (12.5 g.) in benzene (25 ml.) and methylene chloride (20 ml.) at ca. −20°.

The reaction mixture was then kept at room temperature for ½ hr. and partitioned between benzene (25 ml.) and 2 N-sodium hydroxide (25 ml.). The small quantity of gum separating at the interface was redissolved in methylene chloride and combined with the main organic phase. The latter was washed with further alkali (25 ml.), then with pH 4 buffer (2×25 ml., sodium acetate-hydrochloric acid) and dried ($MgSO_4$). Removal of the solvent gave a pale froth which was dissolved in the minimum quantity of hot ethanol. Rapid crystallization occurred, giving the mixed 2′-(+)-α-chlorophenylacetyl derivatives of (+) and (−)-2-dehydroemetine as a pale buff powder 16.2 g.), M.P. 145–150°, $[\alpha]_D^{25}$ +10.8° (c.=1 in chloroform) (Found: C, 70.6; H, 7.1; Cl, 5.6; N, 4.5. $C_{37}H_{43}ClN_2O_5$ requires C, 70.4; H, 6.9; Cl, 5.6; N, 4.4%.)

(b) *Separation of 2′-(+)-α-chlorophenylacetyl derivatives of (+)- and (−)-2-dehydroemetine*

The above material (10.0 g.) was dissolved in hot acetonitrile (50 ml.) and kept overnight at room temperature, affording compacted roundels (2.2 g.), $[\alpha]_D^{25}$ −152° (c., 1 in chloroform). Further crystallization from the same solvent (10 ml.) gave 2′-[(+)-α-chlorophenylacetyl]-(−)-2-dehydroemetine (1.5 g.) as needles, M.P. 156–159°, $[\alpha]_D^{25}$ −177° (c., 1 in chloroform), −195° (c., 1 in benzene). (Found: C, 70.2; H, 6.9; Cl, 5.6; N 4.6% $C_{37}H_{43}ClN_2O_5$ requires C, 70.4; H, 6.9; Cl 5.6; N 4.4%.)

The above acetonitrile mother liquors deposited a further crop of fine needles (1.1 g.), $[\alpha]_D^{25}$ +146° (c., 1 in chloroform) after keeping for a further two days at room temperature. Further crystallizations from ethanol gave 2′-[(+)-α-chlorophenylacetyl]-(+)-2-dehydroemetine (0.5 g.) as fluffy needles M.P. 155–159°, $[\alpha]_D^{25}$ +181° (c., 1 in chloroform). (Found: C, 70.6; H, 7.2; Cl, 5.7; N. 4.5 $C_{37}H_{43}ClN_2O_5$ requires C, 70.4; H, 6.9; Cl, 5.6; N, 4.4%.)

(c) *(−) and (+)-2-Dehydroemetine*

The above (−)-amide (662 mg.), thiourea (230 mg.) and anhydrous sodium acetate (280 mg.) were heated under reflux in n-butanol (20 ml.) for 35 mins. The solvent was removed in vacuo and the residue partitioned between benzene (25 ml.) and 2 N-sodium hydroxide (25 ml.). Two further washings with alkali were carried out, each being back-washed with a little benzene. The combined benzene extracts were extracted with pH 4 buffer (50 ml., sodium acetate-hydrochloric acid). The extract was basified with 2 N-sodium hydroxide and extracted with benzene (3× 20 ml.). Evaporation of this dried ($MgSO_4$) extract gave an ether-soluble froth (380 mg.), which, on crystallization from ether-isopropyl ether, afforded (−) - 2 - dehydroemetine (260 mg.), $[\alpha]_D^{25}$ −181° (c., 1 in methanol).

Similar treatment of the (+)-amide gave (+)-2-dehydroemetine, $[\alpha]_D^{25}$ +176°.

EXAMPLE 3

(a) *Conversion of (±)-2-dehydroemetine into its 2′-L-phenylalanyl-derivatives*

A solution of (±)-2-dehydroemetine (3.14 g.) and N-carbobenzoxy-L-phenylalanine p-nitrophenyl ester (2.76 g.) in acetonitrile (60 ml.) was heated under reflux for 1.5 hrs. After removal of the acetonitrile the residue was partitioned between benzene and sodium carbonate solution. The benzene solution was washed with 2 N sodium carbonate and water and dried over potassium carbonate. Removal of the benzene gave a froth, which was dissolved in benzene:ethyl acetate (1:1) and filtered through alumina (200 g.). Evaporation of the filtrate gave the mixed 2′-N-carbobenzoxy-L-phenylalanyl derivatives of (+) and (−)-2-dehydroemetine; (4.4 g.) $[\alpha]_D^{26}$ +6.6° (c., 1.3 in chloroform), $R_f$ 0.5 on Fluka alumina (chromatographic alumina containing about 5% by weight of plaster of Paris) using benzene/ethyl acetate (1:1) as eluant. (Found: C, 71.8; H, 7.1; N, 5.5. $C_{46}H_{53}N_3O_7$ requires C, 71.6; H, 6.9; N, 5.5%.)

This material (3.06 g.) was dissolved in methanol (60 ml.) and acetic acid (1 ml.) and treated with 5% palladium on carbon (1 g.). A stream of hydrogen was passed through the suspension for 2.5 hrs., the catalyst was removed and the filtrate was taken to dryness. The residue was partitioned between benzene and sodium carbonate solution. Removal of the benzene gave the mixed 2′-L-phenylalanyl derivatives of (+)- and (−)-2-dehydroemetine (2.17 g.), $R_f$ 0.16 and 0.40 on Kieselgel G. (silica gel containing about 13% by weight of plaster of Paris) using ethyl acetate: chloroform: methanol (5:5:2) as eluant.

(b) *Separation of 2′-L-phenylalanyl derivatives of (+) and (−)-2-dehydroemetine*

The above mixture (0.98 g.) in chloroform was chromatographed on silica gel (60 g.). Elution with chloroform gave 2′ - L - phenylalanyl - (−)-2-dehydroemetine (0.255 g.), $[\alpha]_D^{26}$ −153.5° (c., 1.23 in chloroform). Continued elution with chloroform containing 5% methanol gave 2′-L-phenylalanyl-(+)-2-dehydroemetine (0.225 g.), $[\alpha]_D^{26}$ +163° (c., 0.95 in chloroform).

EXAMPLE 4

(a) *Conversion of (±)-2-dehydroemetine into its 2′-L-tyrosyl derivatives*

(i) A solution of N-carbobenzoxy-L-tyrosine (31.5 g.) in dry tetrahydrofuran was cooled in an ice bath and stirred with dicyclohexylcarbodiimide (DCC: 13.0 g.) for 40 mins. The precipitated dicyclohexylurea (DCU) was filtered off and washed with a little tetrahydrofuran. The filtrate was replaced in the ice bath and a solution of (±)-2-dehydroemetine (23.9 g.) in tetrahydrofuran (ca. 250 ml.) added. After 1½ hrs. the mixture was again filtered from DCU and the solvent was removed under reduced pressure. The residual gum was treated with 2 N-sodium carbonate solution and chloroform and filtered from a little more crude DCU. The chloroform was separated, washed with water, pH 4 buffer (twice) and water, dried (magnesium sulphate) and evaporated to dryness. The residual gum was triturated with ether and the mixed 2′-N-carbobenzoxy - L - tyrosyl - derivatives of (+) and (−)-2-dehydroemetine collected and washed with ether (39.2 g.).

This material (2.17 g.) was added to a solution of hydrogen bromide in acetic acid (33%; 15 ml.) and stirred until dissolved. After 45 mins. ether was added and the precipitated gum was triturated until solid and then collected (3.0 g.). This crude hydrobromide (2.0 g.) was dissolved in water, made alkaline with sodium carbonate solution and the mixture extracted with chloroform. Evaporation of the dried chloroform solution and trituration of the residue with ether gave mixed 2′-L-tyrosyl derivatives of (+)- and (−)-2-dehydroemetine as a buff amorphous solid (1.37 g.), similar in infra-red spectrum and in chromatographic behaviour to the mixed tyrosyl amides described in (ii) below.

(ii) DCC (4.94 g.) was added to a solution of N,O-dicarbobenzoxy-L-tyrosine (18.0 g.) in dry tetrahydrofuran (500 ml.) at ice-bath temperature. After 2 hrs. the precipitated DCU was filtered off, the filtrate was treated with a solution of (±)-2-dehydroemetine (9.56 g.) in tetrahydrofuran (100 ml.) and the mixture was kept at room temperature for 16 hrs. Acetic acid (5 ml.) was added and the DCU filtered off. The solvents were removed under reduced pressure and the residue, in ethyl acetate, was washed successively with 4 N-potassium carbonate solution, water, pH 4 buffer and water and dried over sodium sulphate. Concentration to small bulk and filtration removed a further small quantity of DCU and the solution was then evaporated to dryness and evaporated with ether to give the mixed 2′-(N,O-dicarbobenzoxy-L-tyrosyl)-derivatives of (+)-and (−)-2-dehydroemetine (26.9 g.) heavily contaminated with dicarbobenzoxytyrosine. The amides could not be crystallized and did not separate on thin layer chromatography and were used directly.

The mixed amides (20.8 g.) in acetic acid (150 ml.) were shaken with Raney nickel for a few minutes and then filtered and washed with more acetic acid (50 ml.). Palladized charcoal (4.2 g.:5%) was added to the combined filtrates, the air displaced with nitrogen and then a brisk stream of hydrogen was passed through the solution for 6 hrs. The catalyst was filtered off (after purging with nitrogen) and this treatment repeated with fresh catalyst. The catalyst was removed similarly and the filtrate evaporated to dryness under reduced pressure. The residue in chloroform, was washed successively with 4 N-potassium carbonate solution, water and pH 4 buffer. The combined buffer washes were made alkaline with potassium carbonate and the product was collected in chloroform. Evaporation of the chloroform and trituration with ether gave the crude mixed tyrosyl amides as an amorphous solid (7.17 g.). The diastereoisomers separated on thin layer chromatography on silica (methanol); $R_f$ 0.4, 0.28.

(b) *Separation of the 2′-L-tyrosyl derivatives of (+)- and (−)-2-dehydroemetine*

A solution of the mixed amides (6.28 g.), prepared as in (a) above, in chloroform was chromatographed on silica (630 g.). Elution with chloroform containing 2% of methanol eluted the diastereoisomer with $R_f$ 0.4, and negative rotation (2.35 g.). Subsequent elution with chloroform containing 5 to 10% of methanol afforded the other isomer (1.24 g.). The (−)-tyrosyl amide, after crystallization from acetonitrile, had m.p. 129–136°, $[\alpha]_D = -188°$ (c., 1 in CHCl₃). The amorphous (+)-tyrosyl amide had $[\alpha]_D = +162°$ (c., 1% in CHCl₃).

EXAMPLE 5

*Conversion of (±)-2-dehydroemetine into its benzylpenicillinamide*

A solution of benzylpenicillinic acid (from sodium benzylpenicillin) (7.12 g.: 0.02 mol.) in ca. 100 ml. of dry chloroform was treated with dicyclohexylcarbodiimide (DCC.: 2.27 g.: 0.022 mol.). After ½ hr. at room temperature the precipitated dicyclohexylurea (DCU) was filtered off and the resulting solution of benzylpenicillin anhydride was treated with a solution of (±)-2-dehydroemetine (4.78 g.: 0.01 mol) in chloroform (ca. 30 ml.). After a further 1 hr. at room temperature the mixture was washed twice with disodium hydrogen phosphate solution (0.2 M) and water and the organic extract was dried over magnesium sulphate. Removal of the solvent and trituration with ether gave the crude amide (7.58 g.) as a pale pink amorphous solid contaminated with DCC and a little dehydroemetine. Thin layer chromatography on alumina separated the diastereoisomers into two spots $R_f$ 0.5 and 0.35 (benzene/ethyl acetate, 1:3). When chromatographed on alumina (Spence Type H weakened with 5% of 10% acetic acid) using ethyl acetate/benzene (1:1) the material (4.0 g.) was largely irreversibly absorbed but two small fractions were eluted. The first (216 mg.) appeared to be the pure amide with $R_f$ 0.5 by thin layer chromatography and had $[\alpha]_D = +200°$ (c., 2 in EtOAc). The second fraction (492 mg.) appeared to be an equal mixture of the diastereoisomers and had $[\alpha]_D = +96°$ (c., 5 in EtOAc). Both specimens had similar IR spectra to that of the crude amide.

EXAMPLE 6

(a) *Reaction of (±)-2-dehydroemetine with the anhydride of dibenzoyl-(+)-tartaric acid*

(i) A finely ground mixture of (±)-2-dehydroemetine (16.77 g.) and (+)-dibenzoyltartaric anhydride (11.80 g.) was dissolved rapidly in acetonitrile (170 ml.) at 50° and the mixture kept overnight at room temperature. The solid deposit was filtered off, washed with acetonitrile, and then resuspended in refluxing acetonitrile (50 ml.) for 15 mins. The suspension was filtered, the colourless microcrystalline solid washed with acetonitrile and ether and dried in vacuo, affording the half-amide derived from (+)-2-dehydroemetine and dibenzoyl-(+)-tartaric acid (9.61 g.), m.p. 224–226° (decomp.), $[\alpha]_D^{25} +308°$ (c., 1 in chloroform), after drying at 80° in vacuo,

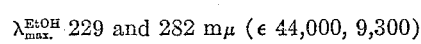

(Found: C. 69.3; H, 6.2; N, 3.6. $C_{47}H_{50}N_2O_{11}$ requires C, 69.0; H, 6.1; N, 3.4%.

The initial acetonitrile mother liquors were concentrated to a gum in vacuo, dissolved in hot acetonitrile (30 ml.) and the solution treated with hot methanol (170 ml.). Crystallization occurred rapidly, affording the half-amide derived from (−)-2-dehydroemetine and dibenzoyl-(+)-tartaric acid as fine needles (8.20 g.), m.p. 185–190° (decomp.), $[\alpha]_D^{25} -142°$ (c., 1 in chloroform) after drying at 80° in vacuo;

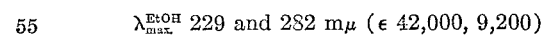

(Found: C, 67.2; H, 6.2; N, 3.3. $C_{47}H_{50}N_2O_{11} \cdot H_2O$ requires C. 67.4; H, 6.2; N, 3.3%.) This material was hygroscopic and was equilibrated in the atmosphere before analysis.

These diastereoisomeric amides had the same $R_f$ on TLC in several systems (on alumina and silica).

(ii) A solution of (±)-2-dehydroemetine (5.00 g.) in benzene (50 ml.) was stirred with 4 N-potassium carbonate (5 ml.) and water (20 ml.), and a solution of (+)-dibenzoyltartaric anhydride (5.30 g.) in dimethyl formamide (10 ml.) was added rapidly. A gelatinous precipitate separated instantaneously, and after stirring for 5 mins. further 4 N-potassium carbonate (10 ml.), water (50 ml.) and chloroform (100 ml.) were added. The organic phase was washed with 2 N-potassium carbonate (2× 25 ml.), the combined washings being back extracted with chloroform (25 ml.). The combined chloroform phases were shaken with 2 N-hydrochloric acid (5.6 ml.), then with pH 4 buffer solution (2× 25 ml., sodium acetate-hydrochloric acid), dried (MgSO₄) and evaporated at a froth in vacuo. This was digested with hot acetonitrile (2× 25 ml.) affording the insoluble (+)-half-amide derivative (3.42 g.), [α]$_D^{26}$ +306°. Treatment of the mother liquors as in (i) gave the (−)-half-amide derivative (2.83 g.) [α]$_D^{26}$ −141°.

(b) (+)- and (−)-2-dehydroemetine

The above (+)-diastereoisomer (5.0 g.), sodium hydroxide (8 g.), water (100 ml.) and ethanol (50 ml.) were heated under reflux for 24 hrs. The ethanol was removed in vacuo and the resulting gum was isolated with benzene, affording an almost colourless froth which readily crystallized from ether and isopropyl ether, giving (+)-2-dehydroemetine (2.36 g.), M.P. 92–97°, [α]$_D^{25}$ +187° with identical analytical, spectral and chromatographic properties to that of (+) material obtained by the alternative routes described above.

Similar treatment of the (−)-amide gave (−)-2-dehydroemetine, M.P. 94–98°, [α]$_D^{25}$ −188.5° (Found: C, 72.9; H, 8.4; N, 5.9. C₂₉H₃₈N₂O₄ requires C, 72.8; H, 8.0; N, 5.8%.)

EXAMPLE 7

(a) Reaction of (±)-2-dehydroemetine with the anhydride of diacetyl-(+)-tartaric acid A solution of (±)-2-dehydroemetine (4.98 g.) and (+)-diacetyltartaric anhydride (2.40 g.) in acetonitrile (50 ml.) was kept at room temperature overnight, affording the half-amide derived from diacetyl-(+)-tartaric acid and (+)-2-dehydroemetine as a colourless powder (3.06 g.), M.P. 195–205° (decomp.), [α]$_D^{20}$ +224° (c., 1 in chloroform). Further crystallization from acetonitrile gave material, M.P. 225–228° (decomp.), [α]$_D^{20}$ +240° (c., 1 in chloroform), λmax. 284 mμ (ε 7,500). (Found: C, 63.6; H, 6.5; N, 4.3. C₃₇H₄₇N₂O₁₁ requires C, 64.0; H, 6.7; N, 4.0%.)

The acetonitrile mother liquors were evaporated to dryness, the residue dissolved in methanol (15 ml.) and an equal volume of ether added. Slow crystallization occurred after several days at 10° affording the half-amide derived from diacetyl-(+)-tartaric acid and (−)-2-dehydroemetine (2.86 g.), [α]$_D^{20}$ −126° (c., 1 in chloroform). Further crystallization from methanol gave fine needles of constant rotation, M.P. 190–193° decomp.), [α]$_D^{20}$ −180° (c., 1 in chloroform), λmax. 284 mμ (ε 7,400). (Found: C, 60.8; H, 6.9; N, 3.9.

requires C, 60.8; H, 6.9; N, 3.8%.)

(b) (+)- and (−)-2-dehydroemetine

Hydrolysis of the above diastereoisomeric amides as in Example 6(b) gave optically pure (+)- and (−)-2-dehydroemetine in 78 and 80% yield, respectively, identical in all respects with the enantiomers of 2-dehydroemetine prepared by the alternative routes described above.

We claim:

1. A process for the recovery of a substantially pure compound selected from the group consisting of an amide of (−)-2-dehydroemetine and an acid addition salt of said amide, comprising physically separating said compound from its optically active isomer contained in a mixture of diastereoisomers selected from the group consisting of an amide of (±)-2-dehydroemetine and an acid addition salt of said amide, each of said amides having attached to the nitrogen atom in the 2′-position an acyl group of an optically active carboxylic acid having an asymmetric center in the α-position relative to the carboxyl group, the attachment being to the carbonyl radical of said acyl group.

2. A process as claimed in claim 1 in which the separation is effected by fractional crystallization.

3. A process as claimed in claim 2 in which said optically active carboxylic acid is a member selected from the group consisting of a di-monocarbocylic aroyl tartaric acid and a di-lower alkanoyl tartaric acid.

4. A process as claimed in claim 3 in which said substantially pure compound is the dibenzoyl-(+)-tartaric acid half-amide of (−)-2-dehydroemetine, said mixture of diastereoisomers is the dibenzoyl-(+)-tartaric acid half-amide of (±)-2-dehydroemetine and said fractional crystallization is effected from acetonitrile as solvent.

5. A process as claimed in claim 2 in which said optically active carboxylic acid is selected from the group consisting of L-phenylalanine, L-phenylalanine having the amino group protected by substitution of a hydrogen atom by a member selected from the group consisting of benzyloxycarbonyl, p-nitrobenzyloxycarbonyl, p-phenylazobenzyloxycarbonyl, p-methoxybenzyloxycarbonyl, t-butoxycarbonyl, trityl, trifluoroacetyl and phthaloyl groups, α-chlorophenylacetic acid and mandelic acid.

6. A process as claimed in claim 1 in which said substantially pure compound is an amide of (−)-2-dehydroemetine and said amide is hydrolyzed to yield (−)-2-dehydroemetine.

7. A process as claimed in claim 6 in which hydrolysis is effected by boiling in alcoholic alkali.

8. A process for the production of a substantially pure amide of (−)-2-dehydroemetine, comprising forming an amide of (±)-2-dehydroemetine to provide a mixture of diastereoisomers, and physically separating said amide of (−)-2-dehydroemetine from its optically active isomer in said mixture, each of said amides having attached to the nitrogen atom in the 2′-position an acyl group of an optically active carboxylic acid having an asymmetric center in the α-position relative to the carboxyl group, the attachment being to the carbonyl radical of said acyl group.

9. A process as claimed in claim 8 in which said substantially pure amide is the dibenzoyl-(+)-tartaric acid half-amide of (−)-2-dehydroemetine and the mixture of diastereoisomers is formed by reacting (±)-2-dehydroemetine with dibenzoyl-(+)-tartaric acid anhydride.

10. A compound selected from the group consisting of (1) an amide of (±)-2-dehydroemetine, (2) an amide of (−)-2-dehydroemetine and (3) an acid addition salt of said amides (1) and (2), each of said amides having attached to the nitrogen atom in the 2′-position an acyl group of an optically active carboxylic acid having an asymmetric center in the α-position relative to the carboxyl group, the attachment being to the carbonyl radical of said acyl group.

11. A compound as claimed in claim 10 in which said optically active carboxylic acid possesses at least 2 carboxyl groups and only one of the carboxyl groups enters into amide formation.

12. A compound as claimed in claim 11 in which said optically active carboxylic acid is selected from the group consisting of tartaric acid and a derivative thereof in which at least one of the two hydroxyl groups is esterified.

13. A compound as claimed in claim 12 in which said optically active carboxylic acid is selected from the group consisting of a di-monocarbocylic aroyl tartaric acid and a di-lower alkanoyl tartaric acid.

14. A compound as claimed in claim 13 in which said optically active carboxylic acid is selected from the group consisting of dibenzoyl-(+)-tartaric acid and diacetyl-(+)-tartaric acid.

15. A compound as claimed in claim 10 in which said optically active carboxylic acid is selected from the group consisting of L-phenylalanine, L-phenylalanine having the amino group protected by substitution of a hydrogen atom by a member selected from the group consisting of benzyloxycarbonyl, p-nitrobenzyloxycarbonyl, p-phenylazobenzyloxycarbonyl, p-methoxybenzyloxycarbonyl, t-butoxycarbonyl, trityl, trifluoroacetyl and phthaloyl groups, L-tyrosine, L-tyrosine having the amino group protected by substitution of a hydrogen atom by a member selected from the group consisting of benzyloxycarbonyl, p-nitrobenzyloxycarbonyl, p-phenylazobenzyloxycarbonyl, p-methoxybenzyloxycarbonyl, t-butoxycarbonyl, trityl, trifluoroacetyl and phthaloyl groups, α-chlorophenylacetic acid and mandelic acid.

References Cited

UNITED STATES PATENTS

| | | | |
|---|---|---|---|
| 3,045,020 | 7/1962 | Battersby | 260—287 |
| 3,132,147 | 5/1964 | Schopf | 260—388 |
| 3,240,782 | 3/1966 | Brossi et al. | 260—287 X |

FOREIGN PATENTS 821,332  10/1959  Great Britain.

OTHER REFERENCES

Brossi et al., Helv. Chem. Acta., vol. 42, pp. 772–88 (1959).

Brossi et al., Helv. Chem. Acta., vol. 42, pp. 1515–22 (1959).

ALEX MAZEL, *Primary Examiner.*

D. G. DAUS, *Assistant Examiner.*